US012640040B2

(12) United States Patent
Zeiynali Farid et al.

(10) Patent No.: US 12,640,040 B2
(45) Date of Patent: May 26, 2026

(54) SYSTEMS AND METHODS FOR LANE IDENTIFICATION USING CONNECTED VEHICLES DATA ON HORIZONTAL CURVES

(71) Applicant: Toyota Motor Engineering & Manufacturing North America, Inc., Plano, TX (US)

(72) Inventors: Yashar Zeiynali Farid, San Jose, CA (US); Emrah Akin Sisbot, Menlo Park, CA (US); Divya Sai Toopran, San Jose, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 105 days.

(21) Appl. No.: 18/626,715

(22) Filed: Apr. 4, 2024

(65) Prior Publication Data

US 2025/0316172 A1    Oct. 9, 2025

(51) Int. Cl.
G08G 1/16 (2006.01)
G06F 18/2321 (2023.01)
G08G 1/0967 (2006.01)

(52) U.S. Cl.
CPC ......... G08G 1/167 (2013.01); G06F 18/2321 (2023.01); G08G 1/096725 (2013.01)

(58) Field of Classification Search
CPC .............. G08G 1/167; G08G 1/096725; G06F 18/2321
See application file for complete search history.

(56) References Cited

U.S. PATENT DOCUMENTS

| | | | |
|---|---|---|---|
| 8,195,360 B2 | 6/2012 | Nakadori et al. | |
| 9,460,624 B2 | 10/2016 | Pandita et al. | |
| 10,074,281 B2 | 9/2018 | Pandita et al. | |
| 10,121,367 B2 | 11/2018 | Jammoussi et al. | |
| 10,657,811 B2 | 5/2020 | McNew et al. | |
| 10,668,922 B2 | 6/2020 | McNew et al. | |
| 12,157,492 B2 * | 12/2024 | Kim .................... | B60W 60/001 |
| 2013/0166194 A1 * | 6/2013 | Delahaye ........... | G01C 21/3667 |
| | | | 701/410 |
| 2017/0247054 A1 * | 8/2017 | Lee ...................... | B62D 15/029 |
| 2017/0303842 A1 * | 10/2017 | Yoshida ................ | B60W 50/14 |
| 2019/0079514 A1 * | 3/2019 | Zhu ........................... | G08G 1/00 |
| 2020/0398750 A1 * | 12/2020 | Aizawa .................... | B62J 50/22 |
| 2021/0200221 A1 * | 7/2021 | Omari .................... | G06N 20/00 |

(Continued)

FOREIGN PATENT DOCUMENTS

| | | |
|---|---|---|
| CN | 108801273 B | 7/2021 |
| CN | 115326079 B | 1/2023 |

(Continued)

*Primary Examiner* — Hussein Elchanti

(74) *Attorney, Agent, or Firm* — Dinsmore & Shohl LLP

(57) ABSTRACT

Provided is a system for identifying lanes in which vehicles are traveling. The system includes one or more processors programmed to identify vehicles traveled on a curved road including lanes; estimate radiuses of curvature for trajectories of the vehicles traveling on the curved road; cluster the radiuses of curvature using a clustering algorithm; and determine lane ID information for each of the vehicles on the curved road based on the clustered radiuses of curvature.

20 Claims, 8 Drawing Sheets

(56) References Cited

U.S. PATENT DOCUMENTS

| | | | |
|---|---|---|---|
| 2021/0300364 A1* | 9/2021 | Sadamura | B60W 30/146 |
| 2022/0161657 A1* | 5/2022 | Seitz | B60K 35/22 |
| 2022/0171590 A1* | 6/2022 | Seitz | B60K 35/22 |
| 2022/0180646 A1* | 6/2022 | Halfaoui | G06V 10/454 |
| 2023/0017377 A1* | 1/2023 | Watanabe | G01C 21/3697 |
| 2023/0347926 A1* | 11/2023 | Hayakawa | G08G 1/052 |
| 2024/0246570 A1* | 7/2024 | Guo | B60W 40/06 |

FOREIGN PATENT DOCUMENTS

| | | | |
|---|---|---|---|
| EP | 2966590 B1 | 4/2023 |
| JP | 4950494 B2 | 6/2012 |
| JP | 2016045144 A | 4/2016 |
| KR | 101481134 B1 | 1/2015 |

* cited by examiner

<u>100</u>

| IDENTIFY VEHICLES TRAVELED ON A CURVED ROAD INCLUDING LANES | 310 |

| ESTIMATE RADIUSES OF CURVATURE FOR TRAJECTORIES OF THE VEHICLES TRAVELING ON THE CURVED ROAD | 320 |

| CLUSTER THE RADIUSES OF CURVATURE USING A CLUSTERING ALGORITHM | 330 |

| DETERMINE LANE ID INFORMATION FOR EACH OF THE VEHICLES ON THE CURVED ROAD BASED ON THE CLUSTERED RADIUSES OF CURVATURE | 340 |

Map Data

| Lane ID | Radius of Curvature |
|---------|---------------------|
| 411 | 50 |
| 413 | 45 |
| 415 | 40 |
| 417 | 35 |

100

SYSTEMS AND METHODS FOR LANE IDENTIFICATION USING CONNECTED VEHICLES DATA ON HORIZONTAL CURVES

TECHNICAL FIELD

The present specification relates to systems and methods for identifying lanes in which vehicles are driving using connected vehicles data on horizontal curves, and more particularly, identifying lanes in which vehicles are driving by estimating radiuses of curvature for trajectories of the vehicles traveling on a curved road.

BACKGROUND

Various applications such as lane-level navigation require identification of the lane that a vehicle is traveling in. One approach for identifying the lane is to use an HD map with high precision GPS sensors. However, such map and sensors can be expensive. In addition, the HD map is currently not widely available. Utilizing single vehicle sensors to identify a lane can lead to uncertain estimates. For instance, lane marker detection has been used to detect lane ID. In this case, if the left lane marker of a vehicle is dashed line and the right lane marker of the vehicle is solid line, then the system might estimate that the vehicle is in the right-most lane. However, such logic can lead to uncertain lane IDs for the middle lanes (if the number of lanes is more than 3), because for middle lanes both left and right markers can be dashed lines. In addition, in areas that lane markers cannot be detected, or the pattern is unavailable, the system cannot accurately estimate vehicles' lane IDs Accordingly, a need exists for providing a method and system for accurately identifying lanes in which vehicles are traveling.

SUMMARY

The present disclosure provides systems and methods for identifying lanes in which vehicles are driving using connected vehicles data on horizontal curves.

In one embodiment, a system includes one or more processors programmed to identify vehicles traveled on a curved road including lanes; estimate radiuses of curvature for trajectories of the vehicles traveling on the curved road; cluster the radiuses of curvature using a clustering algorithm; and determine lane ID information for each of the vehicles on the curved road based on the clustered radiuses of curvature.

In another embodiment, a method for identifying lanes includes identifying vehicles traveled on a curved road including lanes; estimating radiuses of curvature for trajectories of the vehicles traveling on the curved road; clustering the radiuses of curvature using a clustering algorithm; and determining lane ID information for each of the vehicles on the curved road based on the clustered radiuses of curvature.

In yet another embodiment, a non-transitory computer readable medium storing instructions is provided. The instructions, when executed by a processor, cause the processor to perform: identifying vehicles traveled on a curved road including lanes; estimating radiuses of curvature for trajectories of the vehicles traveling on the curved road; clustering the radiuses of curvature using a clustering algorithm; and determining lane ID information for each of the vehicles on the curved road based on the clustered radiuses of curvature.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for identifying lanes in which vehicles are driving using connected vehicles data on horizontal curves.

According to the present disclosure, the present system and method detect lane IDs by utilizing connected vehicles data on roads with horizontal curves. The present system and method utilize connected vehicles sensor data to rank vehicles based on the radiuses the vehicles experienced on a specific road segment with a horizontal curve. Each lane of a horizontal curve has a different radius. By identifying the traveled radiuses of the connected vehicles, the present system and method identify the lane ID of each connected vehicle. The present system and method does not rely on HD map or high-precision GPS for lane identification for vehicles.

Figure 1A:
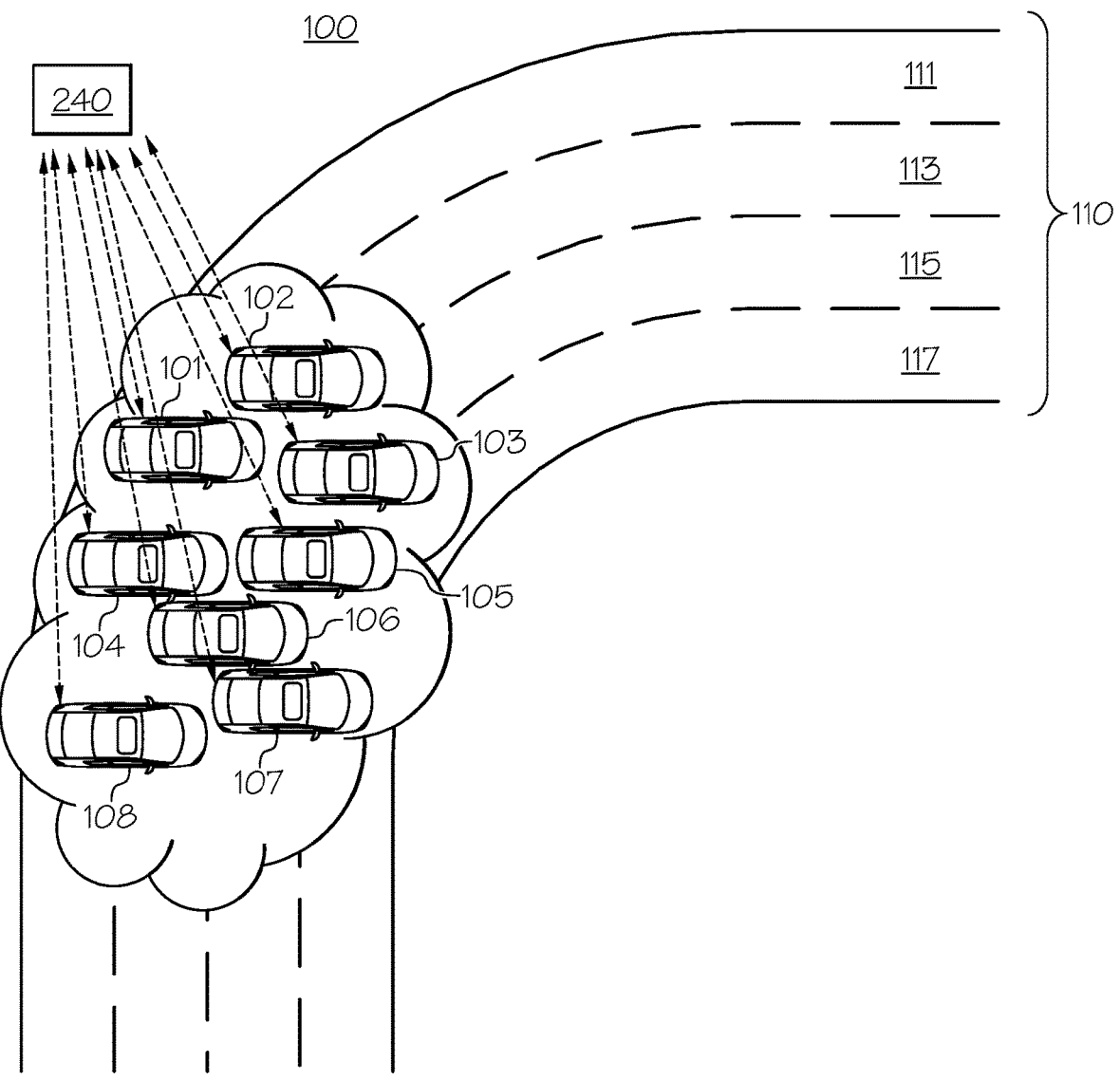
FIG. 1A schematically depicts a system for estimating lanes in which vehicles are traveling, according to one or more embodiments shown and described herein.

FIG. 1A schematically depicts a system for estimating lanes in which vehicles are traveling, according to one or more embodiments shown and described herein. In embodiments, a system 100 includes a plurality of vehicles including connected vehicles 101, 102, 103, 104, 105, 106, 107, 108, and a server 240. The server 240 may be a local server including, but not limited to, roadside unit, an edge server, and the like. In some embodiments, the server 240 may be a remote server such as a cloud server.

Each of the connected vehicles 101, 102, 103, 104, 105, 106, 107, 108 may be a vehicle including an automobile or any other passenger or non-passenger vehicle such as, for example, a terrestrial, aquatic, and/or airborne vehicle. In some embodiment, one or more of the connected vehicles 101, 102, 103, 104, 105, 106, 107, 108 may be an unmanned aerial vehicle (UAV), commonly known as a drone.

The connected vehicles 101, 102, 103, 104, 105, 106, 107, 108 may be autonomous and connected vehicles, each of which navigates its environment with limited human input or without human input. The connected vehicles 101, 102, 103, 104, 105, 106, 107, 108 are equipped with internet access and share data with other devices both inside and outside the connected vehicles 101, 102, 103, 104, 105, 106, 107, 108. Each of the connected vehicles 101, 102, 103, 104, 105, 106, 107, 108 may include an actuator such as an engine, a motor, and the like to drive the vehicle. The connected vehicles 101, 102, 103, 104, 105, 106, 107, 108 may communicate with the server 240. The server 240 may communicate with vehicles in an area covered by the server 240. The server 240 may communicate with other servers that cover different areas. The server 240 may communicate with a remote server and transmit information collected by the server 240 to the remote server.

In FIG. 1A, the connected vehicles 101, 102, 103, 104, 105, 106, 107, 108 are traveling on a curved road 110 including multiple lanes, e.g., lanes 111, 113, 115, and 117. The connected vehicles 101, 102, 103, 104, 105, 106, 107, 108 may not be equipped with high precision GPS sensors, such that the connected vehicles 101, 102, 103, 104, 105, 106, 107, 108 may not have information on which lane they are driving in. For example, the connected vehicle 101 has information that it is driving on the curved road 110, however, the connected vehicle 101 does not have information on which of the lanes 111, 113, 115, 117 the connected vehicle 101 is taking. Similarly, the connected vehicles 102, 103, 104, 105, 106, 107, 108 are not certain about information on lane-level trajectories.

The system 100 utilizes the driving data of the connected vehicles 101, 102, 103, 104, 105, 106, 107, 108 to determine lane-level information for the connected vehicles 101, 102, 103, 104, 105, 106, 107, 108. The system 100 first identifies the connected vehicles 101, 102, 103, 104, 105, 106, 107, 108 on the curved road 110. In embodiments, the server 240 receives driving data of the connected vehicles 101, 102, 103, 104, 105, 106, 107, 108. The driving data may include, but not limited to, the locations, speeds, radial accelerations, orientations, and the like. The server 240 identifies that the connected vehicles 101, 102, 103, 104, 105, 106, 107, 108 are on the curved section of the road 110 based on the locations of the vehicles and map information for the road 110.

In embodiments, the server 240 may use the driving data to estimate the radius of curvature for each of the vehicles. Specifically, the server 240 calculates the radius of curvature using accelerometer data and vehicle speed data. For example, the radius of curvature r is calculated using Equation 1 below.

$$r = v^2/a \qquad \text{Equation 1}$$

where v is the speed of corresponding vehicle and a is the radial acceleration of corresponding vehicle.

Once the server 240 obtains radiuses of curvature for all vehicles that are identified to be in the curved section of the road 110, the server 240 clusters the radiuses of curvature using a clustering algorithm such as DBSCAN. In DBSCAN clustering, the radius parameter can be set as a lane width, such as the width of each of the lanes 111, 113, 115, 117. The lane width information may be retrieved from a map including the road 110. If the map does not include lane width information, the server 240 may assume a lane width based on the category of the road. For example, the lane width of interstate highways is about 12 feet or 3.6 meters.

Figure 1B:
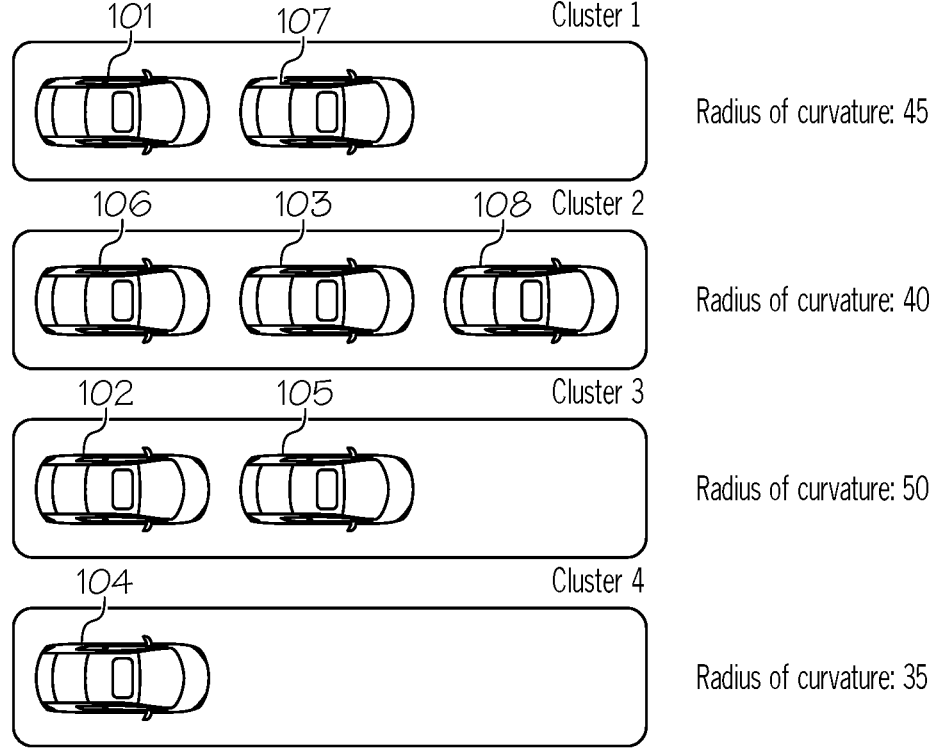
FIG. 1B illustrates clusters based on radiuses of curvature for the connected vehicles, according to one or more embodiments shown and described herein.

FIG. 1B illustrates clusters based on radiuses of curvature for the connected vehicles. For example, cluster 1 includes connected vehicles 101 and 107, cluster 2 includes connected vehicles 103, 106, 108, cluster 3 includes the connected vehicles 102 and 105, and cluster 4 includes the connected vehicle 104. The average radius of curvature related to the connected vehicles 101 and 107 in cluster 1 is about 45 feet. The average radius of curvature related to the connected vehicles 106, 103, and 108 in cluster 2 is about 40 feet. The average radius of curvature related to the connected vehicles 102 and 105 in cluster 3 is about 50 feet. The average radius of curvature related to the connected vehicle 104 in cluster 3 is about 35 feet. Cluster 4 has the shortest radius of curvature and cluster 3 has the longest radius of curvature.

Based on the radius of curvature, the server 240 assigns lanes to the clusters. Specifically, the server 240 assigns the lane 111 to the cluster 3, assigns the lane 113 to cluster 1, assigns the lane 115 to cluster 2, and assigns the lane 117 to cluster 4. The server 240 generates lane ID distribution for each vehicle based on the assigned lane to their cluster. For example, for connected vehicles 101 and 107, the lane ID distribution can be [0.05, 0.75, 0.15, 0.05], which means 5% of being in the lane 111, 75% of being in the lane 113, 15% of being in the lane 115, and 5% of being in the lane 117. Thus, the server 240 determines that the connected vehicles 101 and 107 are likely to be in the lane 113. Similarly, for connected vehicles 102 and 105, the lane ID distribution can be [0.75, 0.15, 0.05, 0.05], which means 75% of being in the lane 111, 15% of being in the lane 113, 5% of being in the lane 115, and 5% of being in the lane 117. Similarly, for connected vehicles 106, 103, and 108, the lane ID distribution can be [0.05, 0.05, 0.75, 0.15], which means 5% of being in the lane 111, 5% of being in the lane 113, 75% of being in the lane 115, and 15% of being in the lane 117. Similarly, for connected vehicle 104, the lane ID distribution can be [0.05, 0.05, 0.15, 0.75], which means 5% of being in the lane 111, 5% of being in the lane 113, 15% of being in the lane 115, and 75% of being in the lane 117.

Figure 1C:
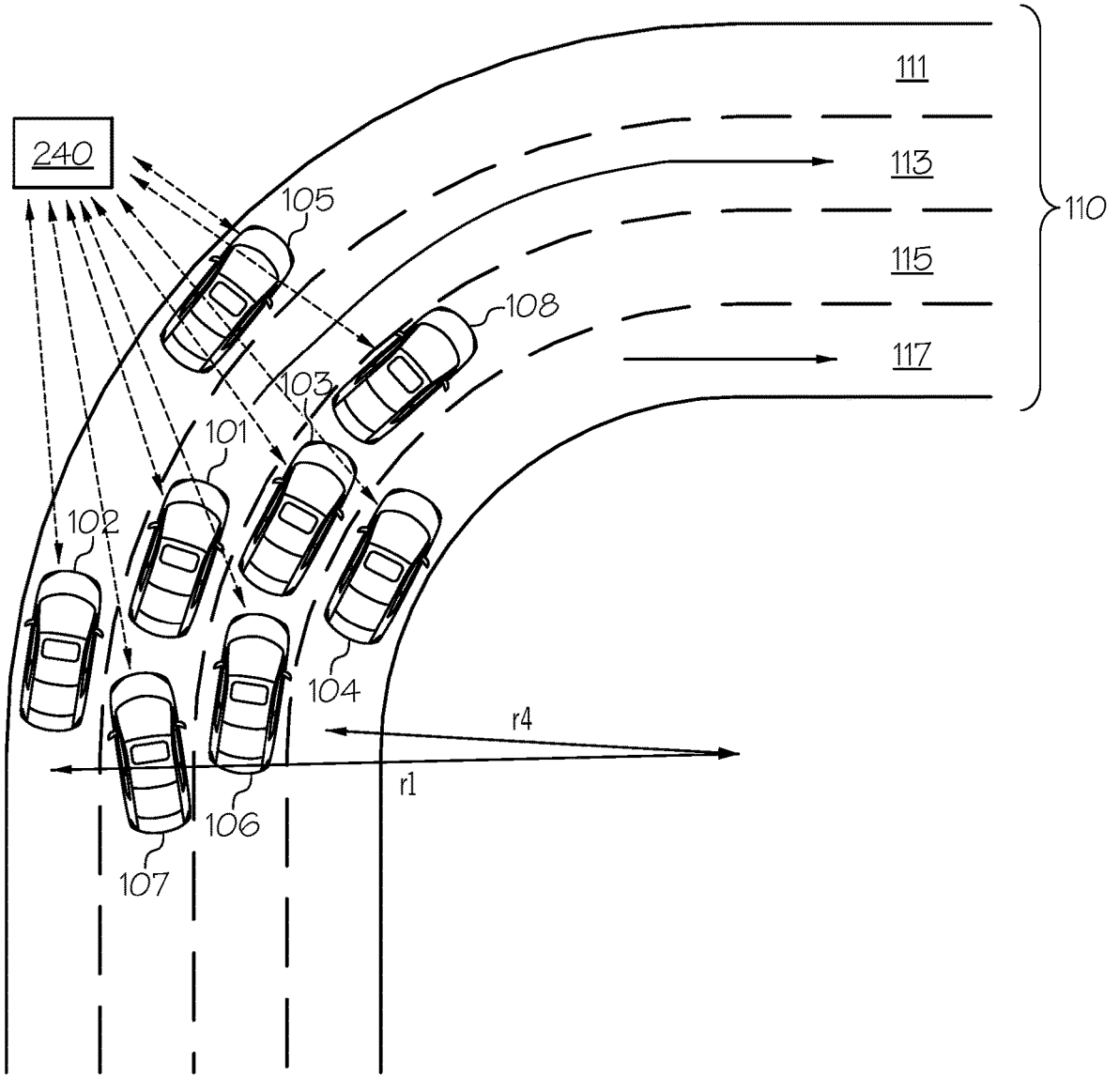
FIG. 1C depicts a server transmitting lane ID information to vehicles, according to one or more embodiments shown and described herein.

FIG. 1C depicts a server transmitting lane ID information to vehicles, according to one or more embodiments shown and described herein. The server 240 transmits lane ID information or lane ID distribution to the vehicles in different clusters. For example, the server 240 informs that the connected vehicles 102 and 105 are in the lane 111. As another example, the server 240 transmits the lane ID distribution of [0.75, 0.15, 0.05, 0.05] to the connected vehicles 102 and 105. Similarly, the server 240 informs that the connected vehicles 107 and 101 are in the lane 113, informs that the connected vehicles 106, 103, 108 are in the lane 115, and informs that the connected vehicle 104 is in the lane 117.

While FIG. 1 illustrates that the server 240 calculates lane ID distributions, one of the connected vehicles may calculate lane ID distributions for the connected vehicles and distributes the lane ID distributions to other connected vehicles.

Figure 2:
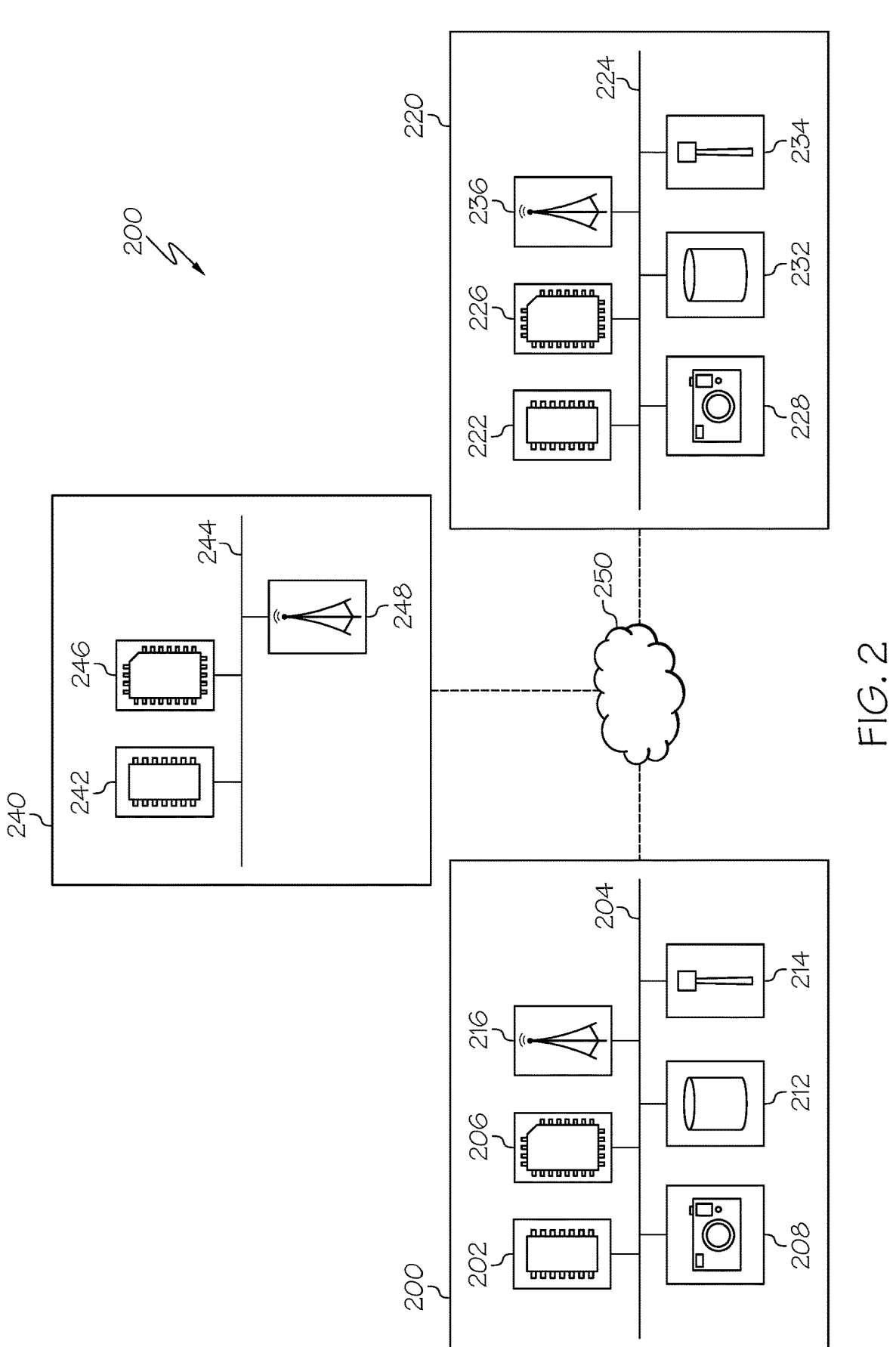
FIG. 2 schematically depicts a system for identifying lanes in which vehicles are driving using connected vehicles data, according to one or more embodiments shown and described herein.

FIG. 2 schematically depicts a system for identifying lanes in which vehicles are driving using connected vehicles data, according to one or more embodiments shown and described herein. The system for identifying lanes includes a first connected vehicle system 200, a second connected vehicle system 220, and a server 240. While FIG. 2 depicts two connected vehicle systems, the system may include more than two connected vehicle systems, for example, 8 connected vehicle systems that correspond to the connected vehicles 101 through 108 in FIG. 1, respectively.

It is noted that, while the first connected vehicle system 200 and the second connected vehicle system 220 are depicted in isolation, each of the first connected vehicle system 200 and the second connected vehicle system 220 may be included within a vehicle in some embodiments, for example, respectively within each of the connected vehicles 101 and 102 of FIG. 1A. In embodiments in which each of the first connected vehicle system 200 and the second connected vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include machine readable instructions that, when executed by the one or more processors 202, identify vehicles traveled on a curved road including lanes, estimate radiuses of curvature for trajectories of the vehicles traveling on the curved road, cluster the radiuses of curvature using a clustering algorithm, and determine lane ID information for each of the vehicles on the curved road based on the clustered radiuses of curvature.

Referring still to FIG. 2, the first connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In some embodiments, the one or more sensors 208 may also provide navigation support. That is, data captured by the one or more sensors 208 may be used to autonomously or semi-autonomously navigate the connected vehicle 101.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first connected vehicle system 200. The first connected vehicle system 200 may capture road boundaries, static objects, moving objects, and the like using one or more imaging sensors.

In operation, the one or more sensors 208 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 200 comprises a satellite antenna 214 coupled to the communication path 204 such that the communication path 204 communicatively couples the satellite antenna 214 to other modules of the first connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring the orientation, motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, a linear acceleration or a radial acceleration of the vehicle.

Still referring to FIG. 2, the first connected vehicle system 200 comprises network interface hardware 216 for communicatively coupling the first connected vehicle system 200 to the second connected vehicle system 220 and/or the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first connected vehicle system 200 may transmit its data to the server 240. For example, the network interface hardware 216 of the first connected vehicle system 200 may transmit captured point cloud generated by the first connected vehicle system 200, vehicle data, location data, and the like to other connected vehicles or the server 240.

The first connected vehicle system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first connected vehicle system 200 may be communicatively coupled to the server 240 by the network 250. In one embodiment, the network 250 may include one or more computer networks (e.g., a personal area network, a local area network, or a wide area network), cellular networks, satellite networks and/or a global positioning system and combinations thereof. Accordingly, the first connected vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

The one or more memory modules 246 may include machine readable instructions that, when executed by the one or more processors 242, identify vehicles traveled on a curved road including lanes; estimate radiuses of curvature for trajectories of the vehicles traveling on the curved road; cluster the radiuses of curvature using a clustering algorithm; and determine lane ID information for each of the vehicles on the curved road based on the clustered radiuses of curvature.

Still referring to FIG. 2, the second connected vehicle system 220 includes one or more processors 222, one or more memory modules 226, one or more sensors 228, one or more vehicle sensors 232, a satellite antenna 234, network interface hardware 236, and a communication path 224 communicatively connected to the other components of the second connected vehicle system 220. The components of the second connected vehicle system 220 may be structurally similar to and have similar functions as the corresponding components of the first connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the network interface hardware 236 corresponds to the network interface hardware 216, and the communication path 224 corresponds to the communication path 204).

The one or more memory modules 226 may include machine readable instructions that, when executed by the one or more processors 222, identify vehicles traveled on a curved road including lanes; estimate radiuses of curvature for trajectories of the vehicles traveling on the curved road; cluster the radiuses of curvature using a clustering algorithm; and determine lane ID information for each of the vehicles on the curved road based on the clustered radiuses of curvature.

Figure 3:
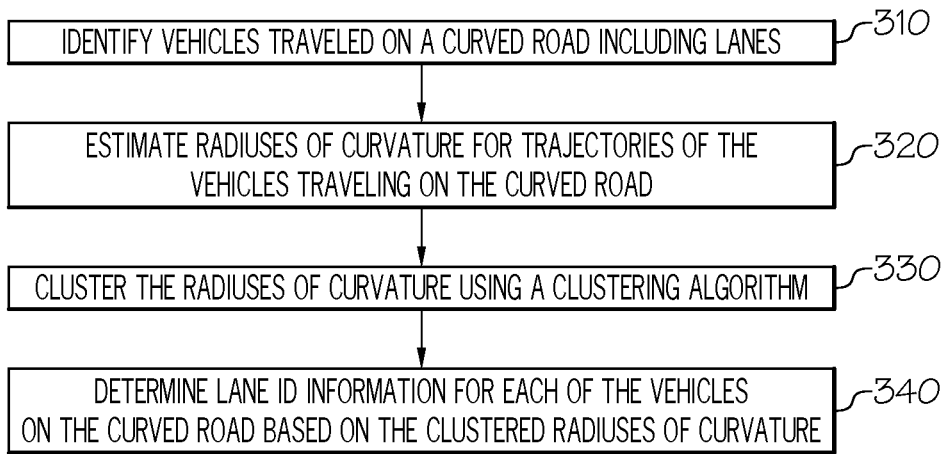
FIG. 3 depicts a flowchart for identifying lanes in which vehicles are traveling, according to one or more embodiments shown and described herein.

FIG. 3 depicts a flowchart for identifying lanes in which vehicles are traveling, according to one or more embodiments shown and described herein.

In step 310, a server identifies vehicles traveled on a curved road including lanes. By referring to FIG. 1A, the server 240 may retrieve map data for the road 110 that includes a curved section. The map data may indicate that the road 110 includes four lanes 111, 113, 115, 117. The map data may include the radius of curvature of each of the lanes 111, 113, 115, 117, e.g., 50 feet, 45 feet, 40 feet, and 35 feet, respectively. In some embodiments, the map data may not include the information on the radiuses of curvature of lanes. The server 240 may receive the locations of the connected vehicles 101 through 108 by communicating with the connected vehicles 101 through 108 and identify that the connected vehicles 101 through 108 are traveling or previously traveled on the curved section of the road 110. For example, the server 240 may match the retrieved map data with the locations of the connected vehicles 101 through 108 and determine that the connected vehicles 101 through 108 traveled on the curved section of the road 110.

Referring back to FIG. 3, in step 320, the server estimates radiuses of curvature for trajectories of the vehicles traveling on the curved road. In embodiments, referring to FIG. 1A, the server 240 may estimate the radiuses of curvature for trajectories of the vehicles traveling on the curved road using vehicle sensor data. The server 240 may receive the vehicle sensor data from the connected vehicles 101 through 108 and the vehicle sensor data may include the linear speed and the radial acceleration of each of the connected vehicles 101 through 108. Then, the server 240 estimates the radiuses of curvature for trajectories of the vehicles traveling on the curved road using the Equation 1 above.

Referring back to FIG. 3, in step 330, the server clusters the radiuses of curvature using a clustering algorithm. By referring to FIGS. 1A and 1B, the server 240 clusters the radiuses of curvature obtained in step 320 using a clustering algorithm, for example, DBSCAN. In DBSCAN clustering, the radius parameter can be set as a lane width, such as the width of each of the lanes 111, 113, 115, 117. The lane width information may be retrieved from a map including the road 110. If the map does not include lane width information, the server 240 may assume a lane width based on the category of the road. For example, the lane width of interstate highways is about 12 feet or 3.6 meters.

FIG. 1B illustrates four clusters that are clustered based on radiuses of curvature for the connected vehicles. For example, cluster 1 includes connected vehicles 101 and 107, cluster 2 includes connected vehicles 103, 106, 108, cluster 3 includes the connected vehicles 102 and 105, and cluster 4 includes the connected vehicle 104. The average radius of curvature related to the connected vehicles 101 and 107 in cluster 1 is 45 feet. The average radius of curvature related to the connected vehicles 106, 103, and 108 in cluster 2 is 40 feet. The average radius of curvature related to the connected vehicles 102 and 105 in cluster 3 is 50 feet. The average radius of curvature related to the connected vehicle 104 in cluster 3 is 35 feet. Cluster 4 has the shortest radius of curvature and cluster 3 has the longest radius of curvature.

Referring back to FIG. 3, in step 340, the server determines lane ID information for each of the vehicles on the curved road based on the clustered radiuses of curvature. By referring to FIGS. 1A, 1B, IC, in embodiments, the server 240 obtains a radius of curvature of each of the lanes based on a map or map data, and determines the lane ID information for each of the vehicles on the curved road based on a comparison of the clustered radiuses of curvature and the obtained radiuses of curvature. For example, the server 240 obtains, from map data, information that the radius of curvature of the lane 111 is 50 feet, the radius of curvature of the lane 113 is 45 feet, the radius of curvature of the lane 115 is 40 feet, and the radius of curvature of the lane 117 is 35 feet. Based on the comparison of the clustered radiuses of curvature and the obtained radiuses of curvature, the server 240 assigns the cluster 1 to the lane 113, assigns the cluster 2 to the lane 115, assigns the cluster 3 to the lane 111, and assigns the cluster 4 to the lane 117.

In some embodiments, the server 240 may not have information on the radius of curvature of each of the lanes 111, 113, 115, 117. Then, the server may determine whether the number of the clustered radiuses matches with the number of the lanes. If the number of the clustered radiuses matches with the number of the lanes, the server ranks the clustered radiuses. For example, by referring to FIGS. 1A and 1B, the number of the clustered radiuses is four and the number of lanes is four. Then, the server 240 ranks the clustered radiuses from the longest radius to the shortest radius. Thus, the clusters are ranked in the following order: Cluster 3, Cluster 1, Cluster 2, Cluster 4. Then, the server determines the lane ID information for each of the vehicles on the curved road based on the ranks of the clustered radiuses. Because Cluster 3 has the longest radius, Cluster 3 matches with the outermost lane, i.e., the lane 111. Because Cluster 4 has the shortest radius, Cluster 4 matches with the innermost lane, i.e., the lane 117. Based on the ranks, Cluster 1 matches with the lane 113, and Cluster 2 matches with the lane 115.

In some embodiments, the server 240 determines the lane ID information for each of the vehicles, which includes a probability of corresponding vehicle being in each of the lanes. For example, for the connected vehicles 101 and 107 in Cluster 1, the server 240 may assign lane ID probability of [0.05, 0.75, 0.15, 0.05], which means 5% of being in the lane 111, 75% of being in the lane 113, 15% of being in the lane 115, and 5% of being in the lane 117.

Once the server 240 determines the lane ID information for each of the vehicles, the server 240 may transmit the lane ID information to the connected vehicles 101 through 108 as illustrated in FIG. 1C such that each of the connected vehicles 101 through 108 knows which lanes they are currently traveling or previously traveled on the road 110. In some embodiments, the server 240 may instruct the connected vehicles 101 through 108 to autonomously drive based on the lane ID information. For example, if the connected vehicle 106 needs to take an exit on the right in 0.5 mile, the server 240 may instruct the connected vehicle 106 to change to the right lane once within the next few seconds.

Figure 4A:
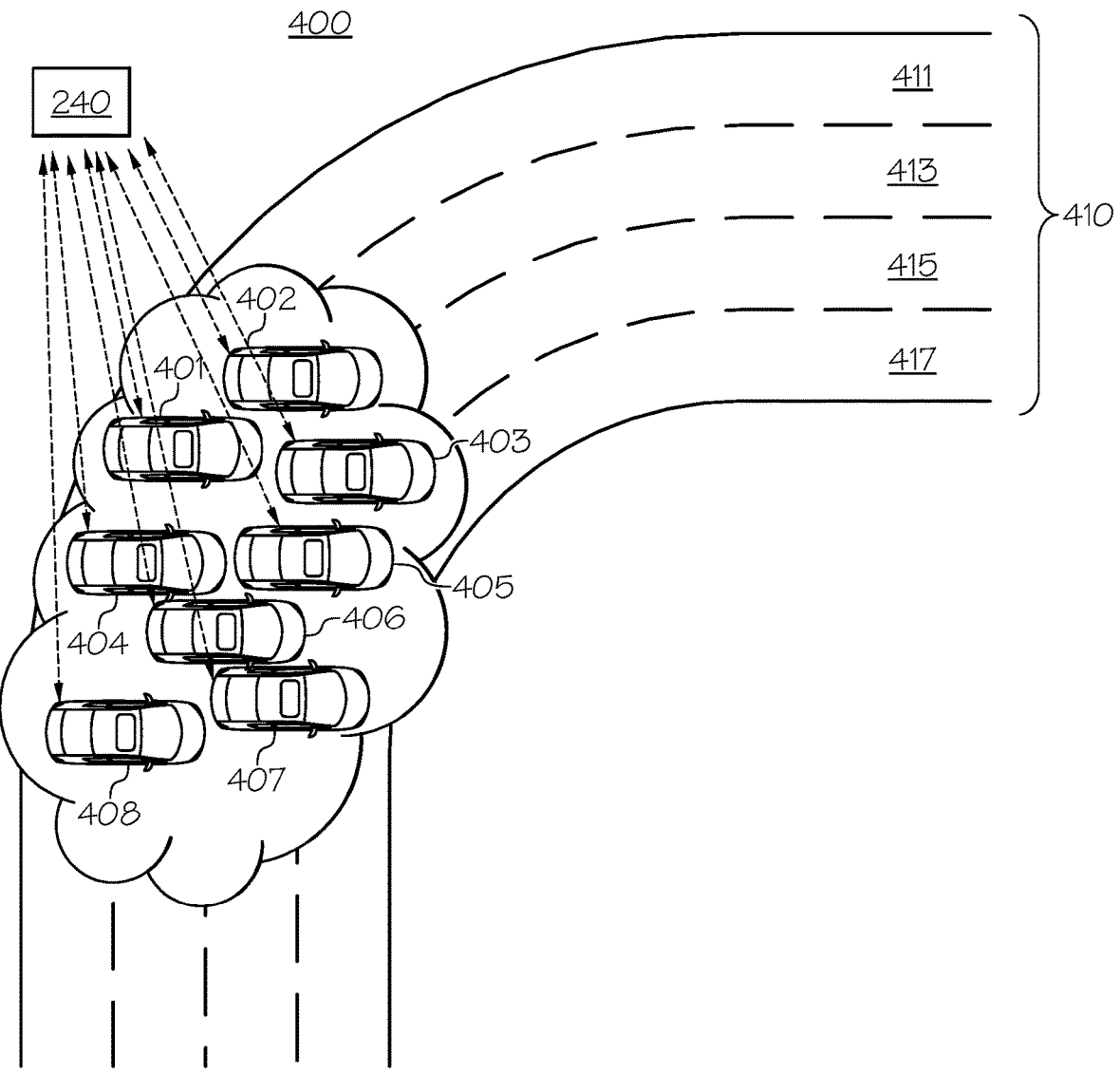
FIG. 4A schematically depicts a system for estimating lanes in which vehicles are traveling, according to another embodiment shown and described herein.

FIG. 4A schematically depicts a system for estimating lanes in which vehicles are traveling, according to another embodiment shown and described herein. In embodiments, a system 400 includes a plurality of vehicles including connected vehicles 401, 402, 403, 404, 405, 406, 407, 408, and a server 240. The server 240 may be a local server including, but not limited to, roadside unit, an edge server, and the like. In some embodiments, the server 240 may be a remote server such as a cloud server. The connected vehicles 401 through 408 are similar to the connected vehicles 101 through 108 in FIG. 1A.

The server 240 may use the driving data of the connected vehicles 401 through 408 to estimate the radius of curvature for each of the vehicles. Specifically, the server 240 calculates the radius of curvature using accelerometer data and vehicle speed data. Once the server 240 obtains radiuses of curvature for all vehicles that are identified to be in the curved section of the road 110, the server 240 clusters the radiuses of curvature using a clustering algorithm such as DBSCAN.

Figure 4B:
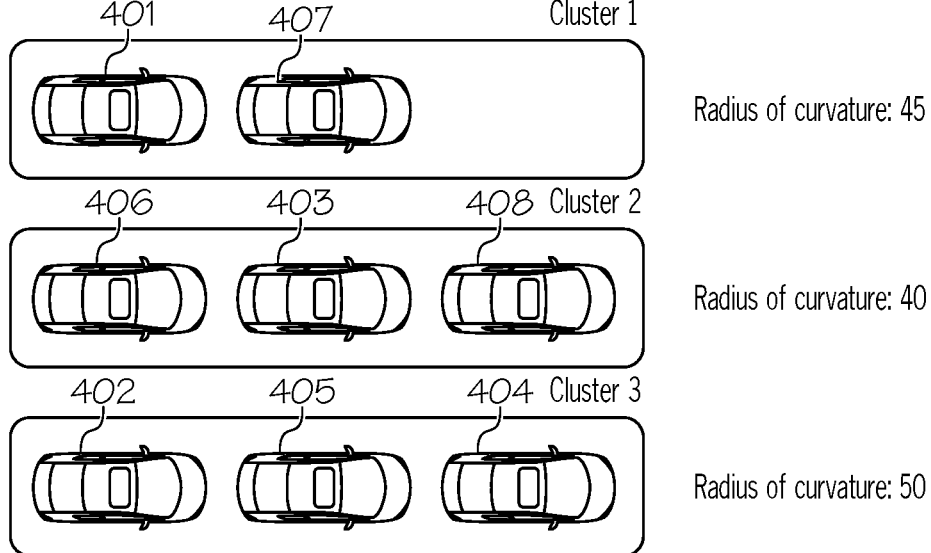
FIG. 4B illustrates clusters based on radiuses of curvature for the connected vehicles.

FIG. 4B illustrates clusters based on radiuses of curvature for the connected vehicles. For example, cluster 1 includes connected vehicles 401 and 407, cluster 2 includes connected vehicles 403, 406, 408, and cluster 3 includes the connected vehicles 402, 405, and 404. The average radius of curvature related to the connected vehicles 401 and 407 in cluster 1 is 45 feet. The average radius of curvature related to the connected vehicles 406, 403, and 408 in cluster 2 is 40 feet. The average radius of curvature related to the connected vehicles 402, 405, and 404 in cluster 3 is 50 feet. Cluster 2 has the shortest radius of curvature and cluster 3 has the longest radius of curvature.

In this case, the number of the clusters do not match with the number of the lanes. The server 240 may retrieve, from map data, the radius of curvature of each of the lanes 411, 413, 415, 417. The radius of curvature of the lane 411 is 50 feet, the radius of curvature of the lane 413 is 45 feet, the radius of curvature of the lane 415 is 40 feet, and the radius of curvature of the lane is 35 feet. Based on the retrieved radiuses of curvature, the server 240 assigns cluster 1 to the lane 413, assigns cluster 2 to the lane 415, and assigns cluster 3 to the lane 411.

Figure 4C:
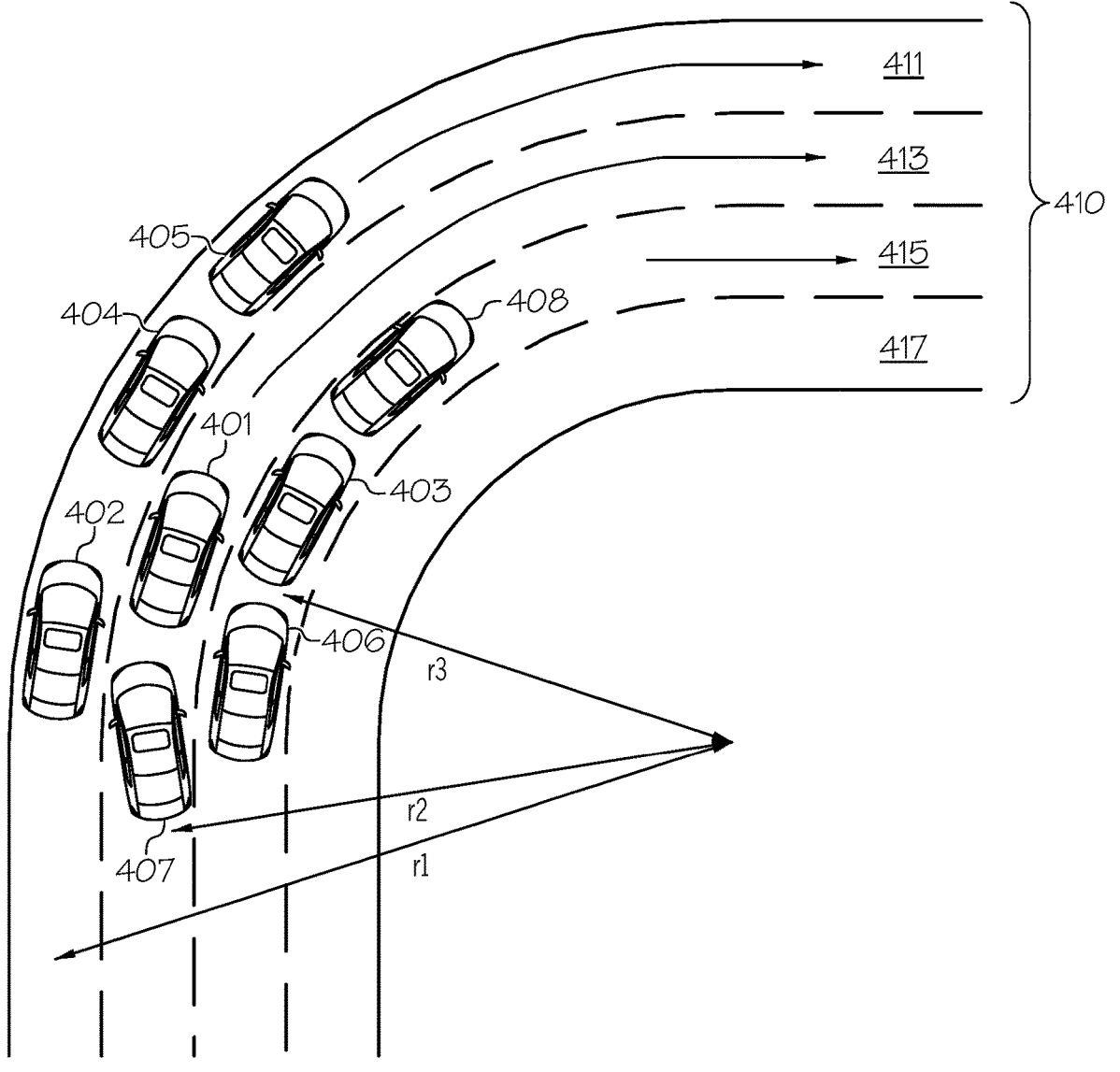
FIG. 4C depicts a server transmitting lane ID information to vehicles, according to one or more embodiments shown and described herein.

Once the server 240 determines the lane ID information for each of the vehicles, the server 240 may transmit the lane ID information to the vehicles 401 through 408 as illustrated in FIG. 4C such that each of the connected vehicles 401 through 408 knows which lanes they are currently traveling or previously traveled on the road 410. In some embodiments, the server 240 may instruct the connected vehicles 401 through 408 to autonomously drive based on the lane ID information.

It should be understood that embodiments described herein are directed to methods and systems for identifying lanes in which vehicles are driving using connected vehicles data on horizontal curves. According to the present disclosure, the present system and method detect lane IDs by utilizing connected vehicles data on roads with horizontal curves. The present system and method utilize connected vehicles sensor data to rank vehicles based on the radiuses the vehicles experienced on a specific road segment with a horizontal curve. Each lane of a horizontal curve has a different radius. By identifying the traveled radiuses of the connected vehicles, the present system and method identify the lane ID of each connected vehicle. The present system and method does not rely on HD map or high-precision GPS for lane identification for vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   one or more processors programmed to:
   identify vehicles traveled on a curved road including lanes;
   estimate radiuses of curvature for trajectories of the vehicles traveling on the curved road;
   cluster the radiuses of curvature using a clustering algorithm;
   determine lane ID information for each of the vehicles on the curved road based on the clustered radiuses of curvature; and
   control at least one vehicle of the vehicles to autonomously drive based on the lane ID information.

2. The system of claim 1, wherein the one or more processors are further programmed to:
   obtain a radius of curvature of each of the lanes based on a map;
   determine the lane ID information for each of the vehicles on the curved road based on a comparison of the clustered radiuses of curvature and the obtained radiuses of curvature.

3. The system of claim 1, wherein:
   the clustering algorithm includes DBSCAN clustering; and
   a radius parameter for DBSCAN is a width of each of the lanes.

4. The system of claim 1, wherein the one or more processors are further programmed to:
   determine whether a number of the clustered radiuses matches with a number of the lanes;
   rank the clustered radiuses in response to determining that the number of the clustered radiuses matches with the number of the lanes; and determine the lane ID information for each of the vehicles on the curved road based on the ranks of the clustered radiuses.

5. The system of claim 1, wherein the one or more processors are further programmed to:

instruct the vehicles to autonomously drive based on the lane ID information.

6. The system of claim 1, wherein the lane ID information includes a probability of corresponding vehicle being in each of the lanes.

7. The system of claim 1, wherein the one or more processors are further programmed to:

estimate the radiuses of curvature for trajectories of the vehicles traveling on the curved road using vehicle sensor data.

8. The system of claim 1, wherein the one or more processors are further programmed to:

transmit the lane ID information to the vehicles.

9. A method for identifying lanes, the method comprising:

identifying vehicles traveled on a curved road including lanes;

estimating radiuses of curvature for trajectories of the vehicles traveling on the curved road;

clustering the radiuses of curvature using a clustering algorithm; and determining lane ID information for each of the vehicles on the curved road based on the clustered radiuses of curvature; and controlling at least one vehicle of the vehicles to autonomously drive based on the lane ID information.

10. The method of claim 9, further comprising:

obtaining a radius of curvature of each of the lanes based on a map; and determining the lane ID information for each of the vehicles on the curved road based on a comparison of the clustered radiuses of curvature and the obtained radiuses of curvature.

11. The method of claim 9, wherein:

the clustering algorithm includes DBSCAN clustering; and a radius parameter for DBSCAN is a width of each of the lanes.

12. The method of claim 9, further comprising:

determining whether a number of the clustered radiuses matches with a number of the lanes;

ranking the clustered radiuses in response to determining that the number of the clustered radiuses matches with the number of the lanes; and determining the lane ID information for each of the vehicles on the curved road based on the ranks of the clustered radiuses.

13. The method of claim 9, further comprising:

instructing the vehicles to autonomously drive based on the lane ID information.

14. The method of claim 9, wherein the lane ID information includes a probability of corresponding vehicle being in each of the lanes.

15. The method of claim 9, further comprising:

estimating the radiuses of curvature for trajectories of the vehicles traveling on the curved road using vehicle sensor data.

16. The method of claim 9, further comprising:

transmitting the lane ID information to the vehicles.

17. A non-transitory computer readable medium storing instructions, when executed by one or more processors, causing the one or more processors to perform:

identifying vehicles traveled on a curved road including lanes;

estimating radiuses of curvature for trajectories of the vehicles traveling on the curved road;

clustering the radiuses of curvature using a clustering algorithm; and determining lane ID information for each of the vehicles on the curved road based on the clustered radiuses of curvature; and controlling at least one vehicle of the vehicles to autonomously drive based on the lane ID information.

18. The non-transitory computer readable medium of claim 17, wherein the instructions, when executed by the one or more processors, cause the one or more processors to further perform:

obtaining a radius of curvature of each of the lanes based on a map; and determining the lane ID information for each of the vehicles on the curved road based on a comparison of the clustered radiuses of curvature and the obtained radiuses of curvature.

19. The non-transitory computer readable medium of claim 17, wherein:

the clustering algorithm includes DBSCAN clustering; and a radius parameter for DBSCAN is a width of each of the lanes.

20. The non-transitory computer readable medium of claim 17, wherein the instructions, when executed by the one or more processors, cause the one or more processors to further perform:

determining whether a number of the clustered radiuses matches with a number of the lanes;

ranking the clustered radiuses in response to determining that the number of the clustered radiuses matches with the number of the lanes; and determining the lane ID information for each of the vehicles on the curved road based on the ranks of the clustered radiuses.

* * * * *